United States Patent
Djordjevic et al.

(10) Patent No.: US 9,852,638 B2
(45) Date of Patent: Dec. 26, 2017

(54) MOVING DEVICE DETECTION

(71) Applicant: Telefonaktiebolaget LM Ericsson (publ), Stockholm (SE)

(72) Inventors: Branko Djordjevic, Herzogenrath (DE); Tim Lauterbach, Kerkrade (NL); Frank Sell, Vaals (NL)

(73) Assignee: TELEFONAKTIEBOLAGET LM ERICSSON(PUBL), Stockholm (SE)

( * ) Notice: Subject to any disclaimer, the term of this patent is extended or adjusted under 35 U.S.C. 154(b) by 0 days.

(21) Appl. No.: 15/035,417

(22) PCT Filed: Jun. 1, 2015

(86) PCT No.: PCT/EP2015/062076
§ 371 (c)(1),
(2) Date: May 9, 2016

(87) PCT Pub. No.: WO2016/192767
PCT Pub. Date: Dec. 8, 2016

(65) Prior Publication Data
US 2017/0103658 A1    Apr. 13, 2017

(51) Int. Cl.
*G08G 5/00*  (2006.01)
*G08G 9/00*  (2006.01)

(52) U.S. Cl.
CPC ......... *G08G 5/0004* (2013.01); *G08G 5/0069* (2013.01); *G08G 9/00* (2013.01)

(58) Field of Classification Search
CPC ....... G08G 5/0004; G08G 9/00; G08G 5/0069
USPC ...................................................... 701/400
See application file for complete search history.

(56) References Cited

U.S. PATENT DOCUMENTS

| | | | | |
|---|---|---|---|---|
| 4,063,073 | A * | 12/1977 | Strayer ............... | G08G 5/0013 701/120 |
| 5,983,161 | A * | 11/1999 | Lemelson ............ | G01S 19/11 340/436 |
| 6,442,484 | B1 * | 8/2002 | Miller ................. | B60R 21/0134 340/990 |

(Continued)

FOREIGN PATENT DOCUMENTS

| WO | WO 2011/057672 A1 | 5/2011 |
|---|---|---|
| WO | WO 2012/055433 A1 | 5/2012 |

(Continued)

OTHER PUBLICATIONS

International Search Report and Written Opinion of the International Searching Authority, Application No. PCT/EP2015/062076, dated May 3, 2016.

(Continued)

*Primary Examiner* — Tyler J Lee
(74) *Attorney, Agent, or Firm* — Sage Patent Group

(57) ABSTRACT

A device moving in a space determines one or more zones around it, wherein the one or more zones are linked to the device and move together with the device through the space. The device detects if a border of a first of the one or more zones starts to intersect or stops to intersect with a border of an area inside the space. If the detecting is affirmative, the device transmits information related to the intersection. An apparatus receives this information from the device and adapts a status value of the area in dependence of the received information.

28 Claims, 10 Drawing Sheets

(56) References Cited

U.S. PATENT DOCUMENTS

| | | | | |
|---|---|---|---|---|
| 6,529,831 | B1* | 3/2003 | Smith | G08G 1/162 340/903 |
| 6,690,296 | B2* | 2/2004 | Corwin | G01S 13/782 340/945 |
| 6,882,915 | B2* | 4/2005 | Yamamura | G08G 1/167 701/301 |
| 6,985,103 | B2* | 1/2006 | Ridderheim | G01S 5/12 342/175 |
| 7,737,878 | B2* | 6/2010 | van Tooren | G01S 13/9303 244/3.1 |
| 8,270,997 | B2 | 9/2012 | Sories et al. | |
| 8,271,186 | B2* | 9/2012 | Nouvel | G01C 23/00 701/10 |
| 8,483,945 | B2* | 7/2013 | Herink | B60T 7/22 180/232 |
| 8,755,998 | B2* | 6/2014 | Braennstroem | B60W 30/09 180/271 |
| 8,824,997 | B2 | 9/2014 | Gehlen et al. | |
| 8,831,604 | B2 | 9/2014 | Gehlen et al. | |
| 8,838,372 | B2* | 9/2014 | Noda | G08G 1/166 340/903 |
| 2003/0004641 | A1 | 1/2003 | Corwin et al. | |
| 2004/0181340 | A1* | 9/2004 | Smith | G08B 21/10 702/3 |
| 2007/0021915 | A1* | 1/2007 | Breed | B60N 2/2863 701/301 |
| 2008/0027647 | A1* | 1/2008 | Ansell | G01S 13/723 701/301 |
| 2009/0027253 | A1* | 1/2009 | van Tooren | G01S 13/9303 342/29 |
| 2009/0174572 | A1* | 7/2009 | Smith | G08G 1/0965 340/902 |
| 2010/0076686 | A1 | 3/2010 | Botargues et al. | |
| 2010/0235099 | A1* | 9/2010 | Sakai | G08G 1/16 701/301 |
| 2011/0035150 | A1* | 2/2011 | Sundarraj | G01S 5/0072 701/301 |

FOREIGN PATENT DOCUMENTS

| | | |
|---|---|---|
| WO | WO 203/053388 A1 | 4/2013 |
| WO | WO 2013/171701 A1 | 11/2013 |
| WO | WO 2013/189974 A2 | 12/2013 |
| WO | WO 2014/040612 A1 | 3/2014 |
| WO | WO 2014/094843 A1 | 6/2014 |
| WO | WO 2015/067303 A1 | 5/2015 |
| WO | WO 2015/089334 A1 | 12/2015 |
| WO | WO 2016/020393 A1 | 2/2016 |

OTHER PUBLICATIONS

Deloitte Touche Tohmatsu Limited, "Drones: high-profile and niche", downloaded from http://www2.deloitte.com/content/dam/Deloitte/global/Documents/Technology-Media-Telecommunications/gx-tmt-pred15-drones-high-profile.pdf, 2015, 4 pp.

Deloitte, "Technology, Media & Telecommunications Predictions 2015", downloaded from http://www.slideshare.net/ThierryLabro/deloittetmt, Jan. 15, 2015, 76 pp.

Jones, "Telecom-Equipped Drones" downloaded May 9, 2016 from http://archive.azcentral.com/business/news/articles/20130424telecom-equipped-drones-could-revolutionize-wireless-market.html, Apr. 27, 2013, 6 pp.

* cited by examiner

MOVING DEVICE DETECTION

CROSS REFERENCE TO RELATED APPLICATION

This application is a 35 U.S.C. §371 national stage application of PCT International Application No. PCT/EP2015/062076, filed on Jun. 1, 2015, the disclosure and content of which is incorporated by reference herein in its entirety.

TECHNICAL FIELD

Various embodiments relate to methods, devices, computer program products and a system for detecting a device moving in a space and for processing information related to this.

BACKGROUND

Today systems for distributing traffic related information (like for example road hazard warnings, traffic density information, traffic warning) exist. Most events, like road hazard information or traffic warnings, contain (among others properties) geographic information. This may comprise a geographic location or a geographic extend, describing where the event is happening, and also geographic information about the affected region.

For example, a particular traffic jam might have a length of 2 km and affects driving for 25 km behind it. It is beneficial to not distribute such information to not affected service users (in the above example to service users not located in the affected region) in order to not load those users and the network with information that does not have any relevance. From network perspective this saves bandwidth.

In order to achieve this first the traffic jam must be detected (for example by monitoring the amount of users in the geographical target area) and second the network area (covering the geographical target area) must be identified where the information about the jam shall be distributed. The identified network area would ideally match with the geographical target area in order to avoid reaching not affected users and so wasting network resources. However the granularity for partitioning a network into areas may be limited due to technical reasons.

For monitoring the amount of users in a geographical area, and informing them in case of for example a hazard warning, mobile networks may be utilized. A server shall be aware where the mobile user (for example the car or a mobile device in the car) is located. Existing tracking/location areas in the mobile system are too coarse for this purpose. Therefore the concept of a "Geo Location Messaging (GLM)" grid is introduced in WO 2012/055433 A1 where a user sends a Geo Messaging location update message each time when he crosses a grid line and so let the GLM system be aware about its location. By dimensioning the grid size reasonably a suitable granularity can be achieved without loading the system with Geo Messaging related location update messages too much.

Current GLM systems operate in the two-dimensional space. Position related data, which the device (for example a client) is sending to the GLM Server, comprises altitude and longitude to indicate its position on a two-dimensional map. However two-dimensional Geo Messaging faces the problem that it is not possible to distinguish between positions which differ in height, like for example for drones or airplanes changing altitudes during a flight. Also, the two-dimensional GLM system cannot differentiate between two vehicles which are driving on different road segments that physically overlap. Those types of road constructions are for instance standard in Japan and occur also in the USA.

More sophisticated GLM techniques are needed due to the different properties of for example drones compared to cars (drones are fast, not bound to streets and require significant skills to fly). Due to those properties drones (or comparable vehicles) are more prone to crashes. Furthermore the less regulated nature of the space where drones move poses additional challenges for the GLM system (compared to for example streets with defined traffic routes, rules and regulation by means like for example traffic lights).

SUMMARY

Therefore, a need exists for developing advanced GLM techniques to support the above mentioned scenarios. In particular it is an objective to provide an improved GLM system for the scenario of drones which are expected to be more extensively deployed by companies. Additionally, the private usage of drones is constantly increasing. With the increasing drone traffic the need for better and faster detection of the drone movements (possibly including their flying properties) is needed, in order to avoid drone crashes or at least minimize the probability of those (drone crashes can be both expensive and potentially dangerous).

This need is met by the features of the independent claims. The dependent claims define refinements and embodiments.

According to an aspect, a method of for a device moving in a space is provided, said method comprising determining one or more zones around the device, wherein the one or more zones are linked to the device and move together with the device through the space. Said method further comprises detecting if a border of a first of the one or more zones starts to intersect or stops to intersect with a border of an area inside the space, and transmitting information related to the intersection when the detecting is affirmative.

According to a further aspect, a method for processing information related to a device moving in a space is provided, said method comprising receiving information from the device located in a first area inside the space indicating that a border of a zone around the device starts to intersect or stops to intersect with a border of a second area inside the space. The method further comprises adapting a status value of the second area in dependence of the received information.

According to a further aspect, a computer program if provided, the computer program comprising instructions which, when executed on at least one processor, cause the at least one processor to determine one or more zones around the device, wherein the one or more zones are linked to the device and move together with the device through the space, to detect a border of a first of the one or more zones starts to intersect or stops to intersect with a border of an area inside the space, and to transmit information related to the intersection when the detecting is affirmative.

According to a further aspect, a computer program if provided, the computer program comprising instructions which, when executed on at least one processor, cause the at least one processor to receive information from the device located in a first area inside the space indicating that a border of a zone around the device starts to intersect or stops to intersect with a border of a second area inside the space, and to adapt a status value of the second area in dependence of the received information.

According to a further aspect, a device moving in a space is provided, the device comprising a determining means for determining one or more zones around a device, wherein the one or more zones are linked to the device and move together with the device through the space, a detecting means for detecting if a border of a first of the one or more zones starts to intersect or stops to intersect with a border of an area inside the space, and a transmitting means for transmitting information related to the intersection when the detecting is affirmative.

According to a further aspect, an apparatus for processing information related to a device moving in a space is provided, the apparatus comprising a receiving means for receiving information from the device located in a first area inside the space indicating that a border of a zone around the device starts to intersect or stops to intersect with a border of a second area inside the space, and an adapting means for adapting a status value of the second area in dependence of the received information.

According to a further aspect, a device moving in a space is provided, the device comprises a processor and a memory, said memory containing instructions executable by said processor, whereby said apparatus is operative to determine one or more zones around a device, wherein the one or more zones are linked to the device and move together with the device through the space, to detect if a border of a first of the one or more zones starts to intersect or stops to intersect with a border of an area inside the space, and to transmit information related to the intersection when the detecting is affirmative.

According to a further aspect, an apparatus for processing information related to a device moving in a space is provided, the apparatus comprising a processor and a memory, said memory containing instructions executable by said processor, whereby said apparatus is operative to receive information from the device located in a first area inside the space indicating that a border of a zone around the device starts to intersect or stops to intersect with a border of a second area inside the space, and to adapt a status value of the second area in dependence of the received information.

According to a further aspect, system for detecting a device moving in a space is provided, the system comprising a device and an apparatus according to one of the above aspects, wherein the device transmits information related to the intersection to the apparatus Under the above aspects the current GLM concept is extended, by allowing a more sophisticated detection of moving devices (like for example drones), and thus enabling a better control of those devices, especially in the 3-dimensional space. However the above proposed methods, devices, computer program products and system are also applicable for 2-dimensional GLM systems. In addition to the drone scenario the invention is also applicable to any other 3-dimensional scenarios like for example under water moving devices, devices bound to the ground like cars or bikes or devices moving in the outer space or underground.

By extending the 2-dimensional GLM to a 3-dimensional system, devices can be localized not only by their flat position on a map, but also by their altitude. Thus, extra use cases and services are enabled. Newer transport technologies and developments can be managed and tracked efficiently by the 3-dimensional GLM concept. 3-dimensional services for smart phones are enabled, like for example to navigate in shopping malls, airports or museums having several floors.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings showing example embodiments. The elements and steps shown in the figure are illustrating various embodiments and show also optional elements and steps.

DETAILED DESCRIPTION OF EMBODIMENTS

Figure 1C:
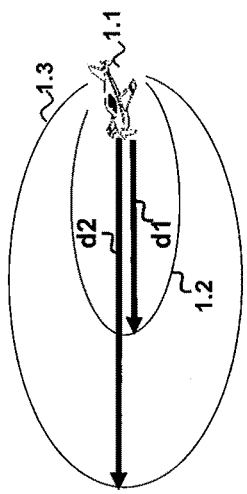
FIG. 1 is an example schematic illustration of a device and zones around the device.

In the following description, for purposes of explanation and not limitation, specific details are set forth, such as particular network environments and communication standards etc., in order to provide a thorough understanding of the invention. It will be apparent to one skilled in the art that the invention may be practiced in other embodiments that depart from these specific details. For example, the skilled person in the art will appreciate that the current invention may be practised with any wireless network like for example UMTS, GSM, LTE or 5G (supporting for example machine-to-machine type communication) networks. As another example, the invention may also be implemented in short-range wireless networks such as WLAN, Bluetooth or WiFi systems or in wireline networks, for example in any IP-based network.

Embodiments will be described in detail with reference to the accompanying drawings. The scope of the invention is not intended to be limited by the embodiments described hereinafter or by the drawings, which are taken to be illustrative only. Elements or steps shown in the drawings may be optional and/or their order may be exchangeable.

The drawings are to be regarded as being example schematic representations, flow diagrams and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

A server may be an application server for GLM, a traffic control server, an element of a mobile core network, an element of a mobile access network or any kind of network element performing the described functionality. The server may be integrated into another network element or may be a stand-alone element.

A device may be portable device (for example a mobile phone, a tablet, a laptop) or a vehicle (for example a car, a plane, a drone, a submarine, a space ship or an under-earth "drone" like for example a robot inspecting oil or minerals under the earth). The portable device may be part of the vehicle (for example temporary or fixed installed in the vehicle) and may function there as the device of the vehicle. Further the device may be a client, for example a GLM client. The device may comprise base station functionality and be a "movable radio base station" (for example in the form of a drone providing cellular access via for example a moving cell).

The device may be connected wireless to the network. The connection of the device may be a mobile network connection (for example GSM, UMTS, LTE, 5G) or any other kind of connection (WLAN/WiFi, Bluetooth, Wimax, . . . ). Alternatively the device may establish the connection directly to the network or via other devices which provide the connection to the network. The device itself may route connection of other devices towards the network.

A 2-dimensional area/zone may be according to the present application an area/zone taking 2 out of the following measures into account: altitude, longitude, latitude. A 3-dimensional area/zone may take all three of those measures into account.

An area in the context of the present application represents a defined part of a space. The area could be for example 2-dimensional or 3-dimensional and has a defined border and position in the space. The border or shape of the area may be described by a combination of geometric primitives, like lines, line segments, arcs, arc segments, circles, ellipses, rectangles, polygons, more complex primitives like Bezier curves, or others, primitives combined via constructive geometry or any other means to describe an area as such or from the combination of descriptions.

A zone in the context of the present application represents an area around the devices which moves together with the device through the space. The zone may be "linked" to the client, which means that the position of the client inside the zone remains the same, independent if the client moves of not. In other words, if the client moves the zone moves together with the client.

Hereinafter, techniques will be described which enable the detection of a moving device in a space. The detection may be done by the device reporting its position to a server or to another device. In order to limit the amount of traffic (for example between the device and the server) a moving device may report its position (and possible some additional parameters) if the device moves (or intends to move) into a defined area, and so avoiding constant reporting of its position.

The area may be defined by a server or another device and may be reported to the device (for example by reporting the border coordinates of the area). Based on the position of the device, and some additional factors like for example speed and moving direction of the device, the device may estimate when it gets close to the border of the area or when it will cross the border of the area. If the device gets close or crosses the border of the area, the device may report this for example to the server or the other device.

The device may notice a situation when it gets close to the border of an area by defining a zone around the device (for example a sphere in a 3-dimensional application) which moves together with the device, and by detecting when the border of such a zone start to intersects with a border of the area where the devices is moving in. A device may define one or more zones around it which may reflect different "closeness" (or warning) levels for detecting nearby areas.

The device may transmit information about the detected event (for example information about the border of the area where it starts to intersect with, information about the zone that intersects) and possibly properties of the device (for example, speed or direction) to the server or the other device. The server (or the other device) may then determine the adjacent area where the device intends to move into and may change the status of this adjacent area based on the received information. A possible status of the adjacent area may be for example "empty—free to move there", "low priority warning—area may be reached by another device soon", "immediate warning—one or more other devices are within or very close to the area", "fully occupied—maximum allowed number of devices reached". The above list of possible status values of an area is just an example and non-exhaustive, other values and/or more or less values are also possible.

Figure 1B:
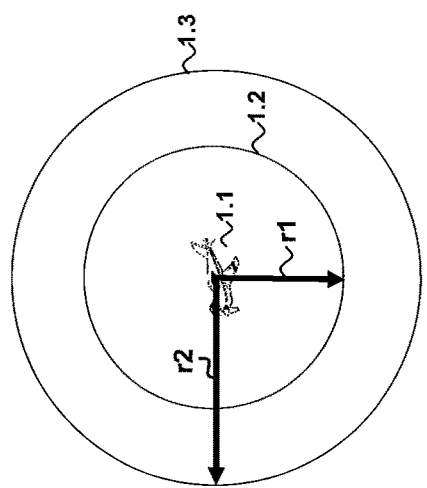
Figure 1A:
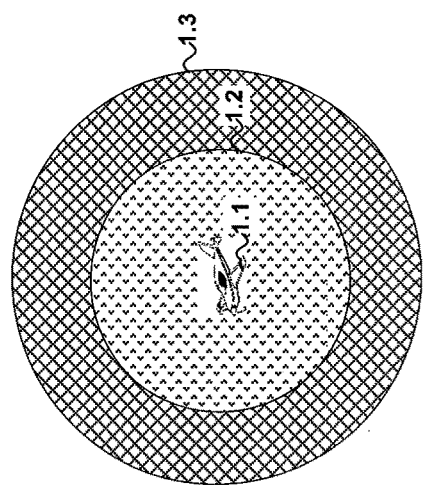

FIGS. 1a to 1c show examples of one or more zones around a device.

FIGS. 1a and 1b illustrates 2 zones (1.2, 1.3) around a device (1.1) which may have a circular form (in the 2-dimensional application) or a sphere form (in the 3-dimensional application. The outer zone (1.3) may be a "lower priority warning zone" indicating that the device is near (which may be used to initiate some early counter measures) while the inner zone may be a "immediate warning zone" indicating that the device is very close (which may be used to initiate some immediate measures to avoid for example a crash or collision). Those zones may be defined by radius r1 and r2 starting from the object (for example from the middle of the device). With the parameters r1 and r2, and with the current position, the location of the zones (circles or the spheres) around the device can be determined.

FIG. 1c shows a variation of the examples shown in FIGS. 1a and 1b, where the form of the zones is different. In FIG. 1c an example with an ellipse (2-dimensional) or a lobe (3-dimensional) form of the zone is shown. It is assumed that the device moves in the direction of the arrows where the parameters d1 and d2 define the distance of the furthest border of the 2 zones around the device. With such a form of the zone the direction where the device moves to can be taken into account. The zones may then better reflect the area which the device may reach in for example a defined time. Parameters d1 and d2 are just example parameters for the shown zone, additional parameters may be needed for defining the exact form of the complete zone.

The concept of 2 zones as shown in FIGS. 1a, 1b and 1c is just an example. The number of the zones can vary from 1 zone to n zones. Forms of the n zones may be similar or different. The determination of the one or more zones may be done by the device. The parameters (for example r1, r2, d1, d2) may be calculated by the device, another device or a server (and in the case of another device or the server sent to the device). Alternatively the server/other device may provide information how to determine a zone, for example information about the size and the form of the zone itself, information about how to determine the zone, one or more rules how to calculate the parameters for determining the zone or one or more rules how to determine the zone itself. The one or more rules may comprise of one or more criterion taken by the rule(s) into account. Different rules for different times of a day (for example day/night rules) may exist. A criterion may be a device specific criterion or it may be provided by the server.

Device specific criterion may be (non-exhaustive list):
speed of the device,
direction of the device,
type of the device (for example, "drone", "car", "airplane", "mobile phone")
class of the device (for example emergency, police, private, commercial)
location information of the device
time of the day
application type of the device (for example the purpose for which the device is used like for example using a drone for an agricultural purpose).

Provided criterion by the sever may be (non-exhaustive list):
traffic information in the proximity of the device
information about weather conditions
sight/visibility,
time of the day when a rule is valid Beside the criteria contained in the two lists above also other criteria could be taken. Further criteria could relate for example to the environment where the device moves, to the device itself (for example its properties and moving parameters), or to parameters/properties provided by the server/controller or other devices which may be for example in the proximity of the device.

The form of the zones as shown in FIGS. 1a to 1c are just examples. Any other form may be possible. The form itself may be defined by a rule or by a special parameter (for example the special parameter could be "form", where "form" may be "circle/sphere, ellipse/lobe or square/cube).

Figure 2:
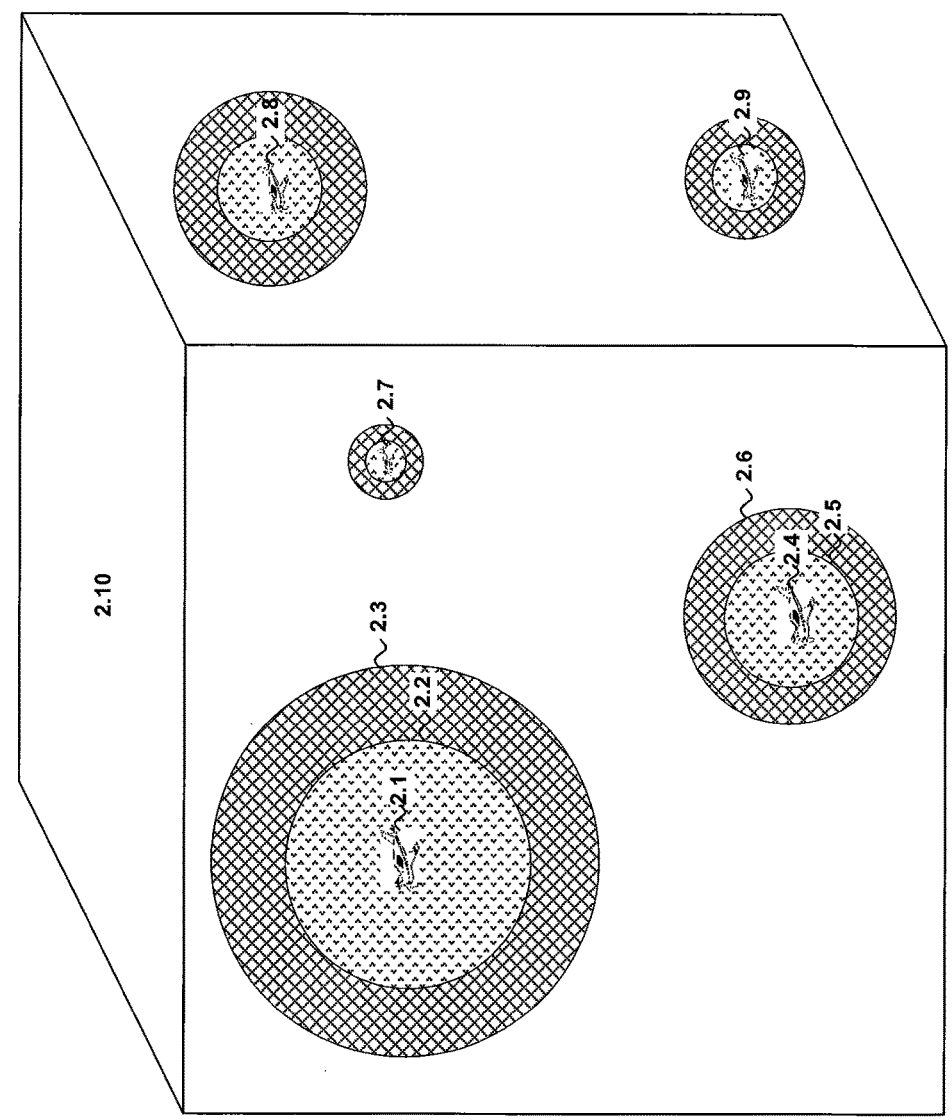
FIG. 2 illustrates an example of multiple devices with various zones sizes around them in one area.

FIG. 2 shows an example of a cubical area (2.10) where several devices (2.1, 2.4, 2.7, 2.8 and 2.9) are located in. Such an area may have the status "occupied—one or more other devices are already in the area" or "fully occupied—maximum allowed number of devices reached" (in this example maximum number of objects would be then 4). In FIG. 2 the devices are supposed to have 2 spheres around them (for example 2.2 and 2.3, or 2.5 and 2.6). Based on parameters, for example the speed of the device, the spheres of a device may have different sizes. For example device 2.1 is supposed to travel with high speed and has therefore bigger sphere sizes around it, while device 2.7 may travel with low speed (or may not move at all) and has therefore smaller sphere sizes around it.

Adapting the size of the spheres (and possibly also the form of the spheres as shown in FIG. 1c) dynamically to device properties, like for example speed and direction of the device or any other parameter or criterion taken into account during the determination process of the spheres by the device, offers the advantage that the warning time (time until a device reaches the border of a sphere) could be made independent from the properties of the device, or could at least be kept in a reasonable time frame. In case of a uniform sphere size, which would be then independent from device properties, a warning time will be for example reverse-proportional to the speed of a device, and thus decrease if the speed of the device increases.

FIG. 2 shows that several devices (2.1, 2.4, 2.7, 2.8 and 2.9) may be located within one area (2.10). In order to avoid collisions between the devices, moving of the devices inside the area may need to be coordinated by a server (or controller), or the devices itself may start to communicate their position and zones (for example via an ad-hoc network like WiFi) between each other in order to coordinate their movements.

Figure 3A:
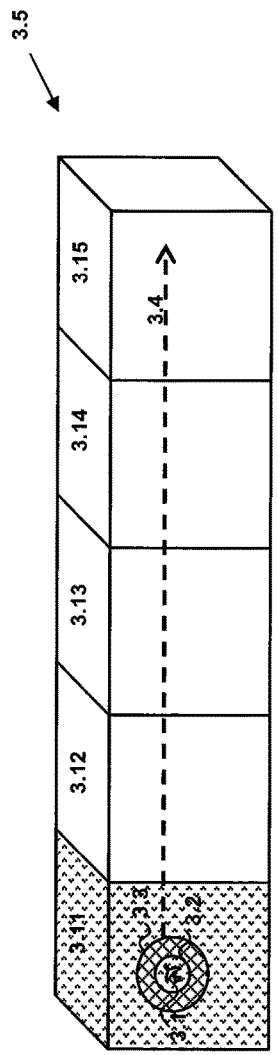
FIG. 3 shows an example embodiment of a device with its zones moving through various areas.
Figure 3B:
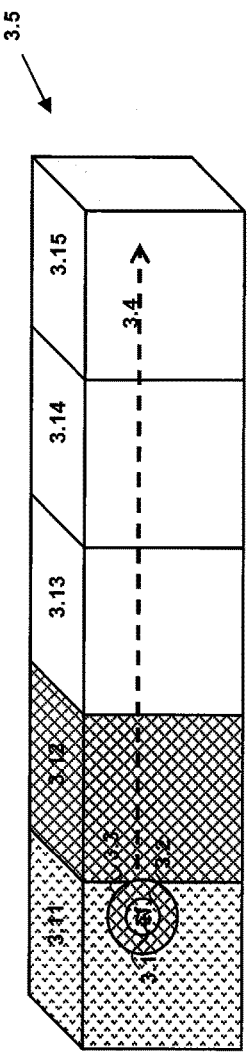
Figure 3C:
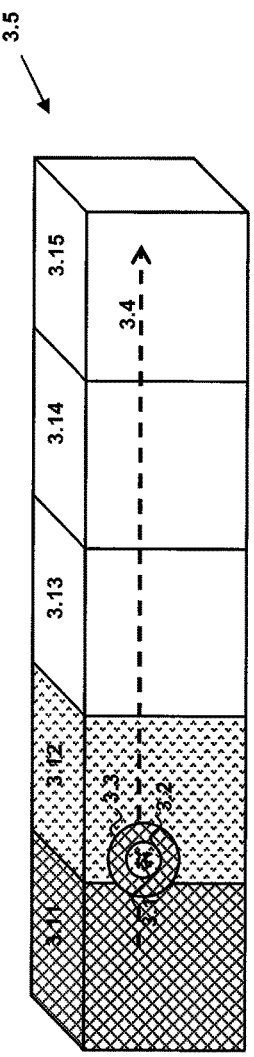

While FIGS. 1a to 1C and FIG. 2 concentrate on the zone around a device (and so on the device view), FIGS. 3a to 3c show an example how a server, a controller or another central element (from now on referred as a server) may utilize information that a zone of a device intersects with an area, the information being reported by the device. Such a server/network element may be implemented in a cloud and could be therefore also physically distributed.

FIGS. 3a to 3c show an example space (3.5) which is divided in cubical areas. For simplification reasons only a subset of cubes (3.11, 3.12, 3.13, 3.14 and 3.15) are shown. Device 3.1 has two determined zones around it (an "immediate warning zone" 3.2 and a "lower priority warning zone" 3.3) and moves 3.4 from cube 3.11 towards cube 3.15 through cubes 3.12, 3.13 and 3.14. In the present example the 2 zones of device 3.1 are 3-dimensional and have the form of a sphere.

Starting from FIG. 3a device 3.1 is located in cube 3.11. Zones 3.2 and 3.3 of device 3.1 are not intersecting with any adjacent cube. The server marks cube 3.11 with an "immediate warning" status since zone 3.2 of device 3.11 intersects with cube 3.11, while cubes 3.12 to 3.15 are marked with "empty" status since no device is located in or close to those (for simplification reasons other adjacent cubes to cubes 3.11 to 3.15 are left out of this example). The "immediate warning" status of cube 3.11 may be for example flagged to devices located in cube 3.11 or in adjacent cubes (for examples devices tend to enter to cube 3.11) as a warning sign that there is already a device in cube 3.11, and that there exists a risk of a crash when they enter cube 3.11.

Turning to FIG. 3b. Device 3.1 has meanwhile moved closer to cube 3.12 and the outer "lower priority warning zone" 3.3 of device 3.1 starts to intersect with cube 3.12. Device 3.1 detects the intersection and informs the server about it. The server notices that the "lower priority warning zone" 3.3 of device 3.1 intersects with cube 3.12 and may change as consequence the status of cube 3.12 to "low priority warning" status. Like described for cube 3.11 above, the change in the cube 3.12 status may be reported to other devices located in adjacent cubes of cube 3.12 which are close to cube 3.12 (for example to devices that have one or more zones intersecting with cube 3.12) as a "low priority" warning sign. Those other devices may then avoid entering into cube 3.12 unless the cube status becomes again "empty" in order to minimize the risk of for example a crash (alternatively the other devices may reduce their speed before entering cube 3.12).

In FIG. 3c device 3.1 continues to move towards cube 3.12. When the "immediate warning zone" 3.2 of device 3.1 starts to intersect with cube 3.12, a similar procedure as explained above for FIG. 3b is triggered (the server will set the status of cube 3.12 to "immediate warning" and inform devices in the adjacent cubes in the same way as outlined above). If device 3.1 moves further the "immediate warning zone" 3.2 at some point stops to intersect with cube 3.11. Device 3.1 reports the stopping of intersection of zone 3.2 to the server. As a consequence, if no other devices are located in cube 3.11, the server changes the status of cube 3.11 to "low priority warning" status and informs devices in the adjacent cubes of cube 3.11 about the status change in the same way as outlined above.

Finally, if also zone 3.2 of device 3.1 stops to intersect with cube 3.11 (not shown) device 3.1 informs the server, and the server may change the status of cube 3.11 to "empty" (assuming no other devices are in or close to cube 3.11) and communicate the status change to devices in the adjacent cubes of cube 3.11 (as described above).

During the whole process device 3.1 itself may be kept up-to-date by the sever about status changes of cubes adjacent to the cube where device 3.1 is located or of cubes where one or more zone of device 3.1 intersects with.

Figure 4:
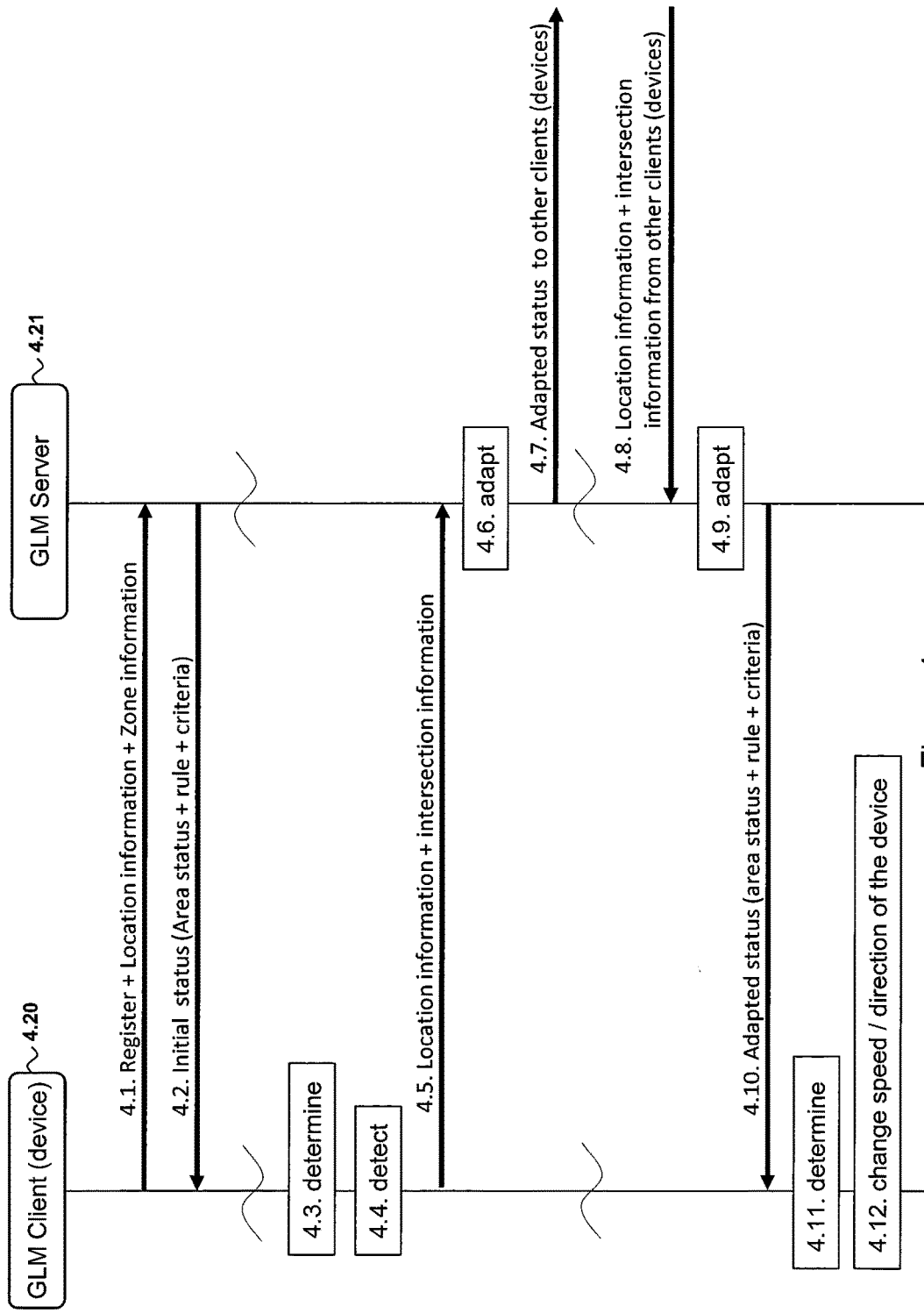
FIG. 4 is an example message flow diagram between a device and a server.

FIG. 4 shows an example message flow diagram reflecting the process as described in conjunction with FIGS. 1a to 3c.

In an initial state device 4.20 may register in step 4.1 at the GLM Server 4.21. With the registration device 4.20 may inform the server 4.21 about its location and about one or more of its properties (for example device identification, device speed, device direction, device class, device type) and about information related to one or more zones around the device 4.20.

The server 4.21 may return in step 4.2 information about the initial status like the area where the device is located in (for example area form, size, coordinates, information about the border of the area, current area status) and optionally information about rules and one or more criterion to be used by the device for determining its one or more zones around it. Also information of adjacent areas, if for example a zone of the device intersect with those, may be submitted to the device 4.20 in step 4.2. Further the server 4.21 may deliver traffic information in the proximity of the device to the device.

It should be noted that steps 4.1 and 4.2 of FIG. 4 show an initial part of the process, which may be performed when the device 4.20 registers (or re-registers) with the server 4.21.

Based on the received information device 4.20 may determine in step 4.3 the one or more zones around it and may detect in step 4.4 if the one or more zone around the device 4.20 starts or stops to intersect with a border of the area where the device is located in. This step is performed constantly when the device moves. Constantly could mean in certain short intervals where the interval period may be adapted to device properties like for example the speed of device 4.20. Those intervals may be controlled by the server and may be configured by the server in the device 4.20.

If the device 4.20 detects that an intersection of one of its zones starts or stops with the border of the area where it is in, device 4.20 informs the server 4.21 in step 4.5. This information may comprise identification information of the device, location information of the device, speed and/or direction of the device, information about the zone where the device is located in and information about at which border position the intersection has started or stopped (this list is non-exhaustive) Step 4.5 may be performed each time when the starting or the stopping of an intersection of a zone of the device with the border of the area where the device is located is detected. The informing of step 4.5 may happen by sending a "location update message" from device 4.20 to server 4.21.

The server 4.21 adapts then the status of the area where the intersection starts or stops in step 4.6. If a zone of the devices starts to intersect with an area the status of the area may be adapted in line with the zone of the device 4.20 that intersects. If the zone of the device stops to intersect with an area, the status of the area may be set to "empty" (if this was the last zone of the device intersecting with the area, and if no other devices are located in the area or have zones intersecting with the area), or the status of the area may be set in line with a zone of the device 4.20 which still intersects, or the status of the area may be set in line with a zone of another device that intersects with the area (for example if the priority status of the zone intersecting by the other device is highest in the area). This allows a "clean-up" function, where area status values get updated when device spheres are no longer intersecting.

In the following two examples are given how the status of an area may change if a zone of a device starts or stops to intersect the area. In the examples it is assumed that the device has two zones, an inner "immediate warning" zone and an outer "low priority warning" zone. Correspondingly two area status values are assumed, "immediate warning" or "low priority warning" status. The examples below show how an intersecting zone type may relate to the adaptation of status value of an area.

In the first example below (Table 1) it is assume that the area will be "empty" when a zone of a device starts to intersect and that the area will be "empty" again after the intersection of the zone of the device stops. No other devices are assumed to be in or close to the area:

TABLE 1

| Intersection | Zone intersecting | Area status before intersection | Area status after intersection |
|---|---|---|---|
| starts | Low priority warning | Empty | Low priority warning |
| starts | Immediate warning | Low priority warning | Immediate warning |
| stops | Immediate warning | Immediate warning | Low priority warning |
| stops | Low priority warning | Low priority warning | Empty |

In another example (Table 2) it is assumed that another device with similar 2 zones is close to the area and that the out "low priority warning" zone intersects with the area, so that the area status is already "low priority warning" due to the other device:

TABLE 2

| Intersection | Zone intersecting | Area status before intersection | Area status after intersection |
|---|---|---|---|
| starts | Low priority warning | Low priority warning | Low priority warning |
| starts | Immediate warning | Low priority warning | Immediate warning |

TABLE 2-continued

| Intersection | Zone intersecting | Area status before intersection | Area status after intersection |
| --- | --- | --- | --- |
| stops | Immediate warning | Immediate warning | Low priority warning |
| stops | Low priority warning | Low priority warning | Low priority warning |

Finally the server 4.21 may inform in step 4.7 other devices located in the area, or devices with an intersecting zone to the area with the adapted status, about the adapted status.

Together with this information the server 4.21 may also send adjusted rule(s) and one or more criterion for zone determinations to be used by the informed devices, based on the adapted area status.

If no intersection of a zone of device 4.20 with the area is detected, device 4.20 may calculate based on its position and the known border positions of the area, and based on its speed and direction, the time until it will reach the border or until one of its spheres may reach the border (this step is not shown in FIG. 4). The device may then initiate appropriate actions based on the calculated time (for example change speed or direction in order to avoid approaching the area in a certain time frame or with a certain speed, or start actions in order to circumvent the area ahead of the device).

Steps 4.3 and 4.7 of FIG. 4 may be performed constantly after a device has registered and is moving. Especially the determining step 4.3 may be performed frequently in order to adapt the zone size and zone form to changing one or more criterion or properties or to a changing rule. Also the detecting step 4.4 may be performed frequently while the device is moving.

Steps 4.8 to 4.11 show an example message flow when another device reports the starting/stopping of an intersection (step 4.8) with an area where device 4.20 is located in, or where at least one zone of device 4.20 may intersect with. In response to step 4.8 the server 4.21 may adapt the area status in step 4.9 in line with the received information in step 4.8 and may send the adapted status information to device 4.20 in step 4.10. Optionally server 4.21 may also send adapted rule(s) and one or more adapted criterion for determining the zones of device 4.20 in step 4.10 to device 4.20. Device 4.20 may then determine in step 4.11 updated zones (for example size and form of one or more of the zones around a device) in line with the received information in step 4.10. Further device 4.20 may consider to change its moving strategy taking the adapted area status information received in step 4.10 into account. For example device 4.20 may change in step 4.12 the moving speed or direction or try to circumvent the area with the adapted status, or device 4.20 may decide to move into the area if the new status is "empty". Device 4.20 may also decide to wait until the status of the area changes to for example "empty" and move then into the area. In general device 4.20 may continue with the detection step 4.4 after the determining step 4.11 and the change step 4.12 have been performed.

Steps 4.8 to 4.12 are triggered by another device sending information in step 4.8 to the server, and may therefore happen more or less often.

Figure 5:
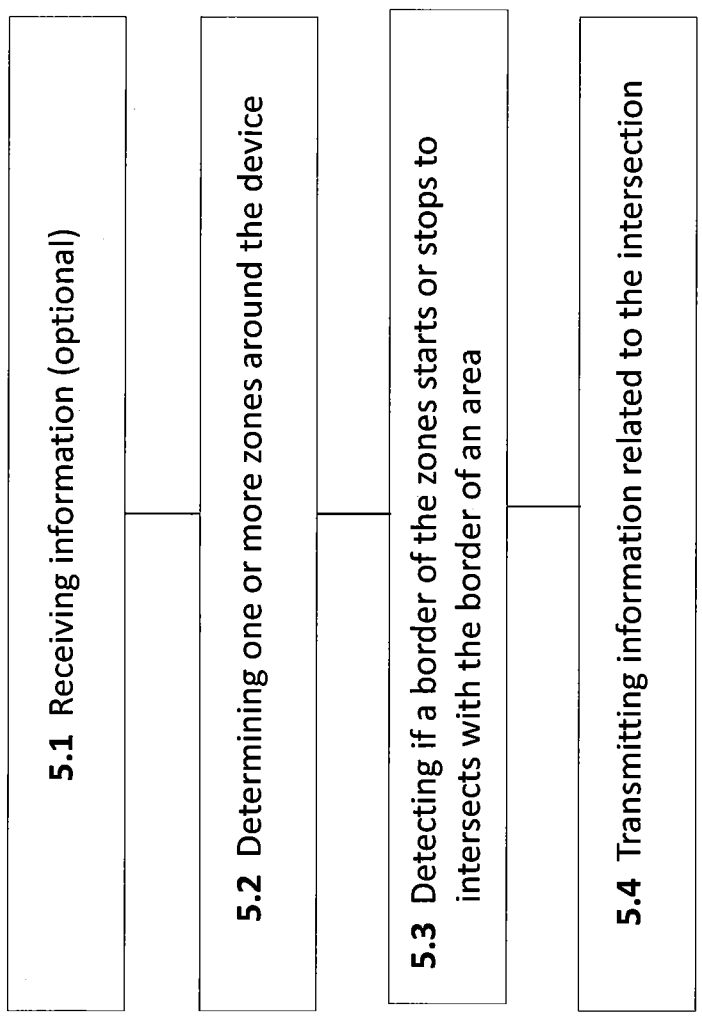
FIG. 5 illustrates an example of a method performed by a device.

FIG. 5 shows a method according to an embodiment performed by the device (for example device, 1.1, 2.1, 3.1 or 4.20). In step 5.1 (which may be optional) the device may receive information, for example in line with steps 4.2 or 4.10 of FIG. 4. Thus the received information in step 5.1 may be "Initial status information" after the device registered with a server (see for example step 4.2 of FIG. 4) or may be "Adapted status information" received from a server (see for example step 4.10 of FIG. 4).

In step 5.2 the device determines the size and the form of one or more zones around it. This step relates to steps 4.3 or 4.11 of FIG. 4. The determining step 5.2 may be performed each time when a rule or a criterion changes. A criterion may be a property of the device (for example speed or the direction where device moves), or a criterion which may be provided by the server (e.g. weather conditions, traffic density), or a non-device and non-server dependent parameter like for example time.

In step 5.3 the device detects if a border of a zone around the device starts or stops to intersect with the border of an area. This step relates to step 4.4 of FIG. 4. The area may be the area where the device is located in or an adjacent area. The detection step 5.3 may be performed when the device moves (for example the device checks if an intersection starts/stops in frequent intervals while moving) or step 5.3 may be performed if a change in the form or the size of a zone around the device is determined, or if a change in the area/border of the area (for example the cubical area 2.10 in FIG. 2) happens.

If the device detects in step 5.3 that an intersection of a zone of the device with the border of the area starts or stops, the device transmits in step 5.4 information related to the intersection (for example which zone intersects, if an intersection starts or stops, which border of the area is intersected) and optionally also information related to the device (for example the location of the device, speed and direction of the device). The transmission may be done towards the server (see for example step 4.5 of FIG. 4) or may be done to another device (for example if the area where the zone of the device intersects with is a zone of another device, ad-hoc communication between the devices may be used for coordinating then the movements of the devices).

Figure 6:
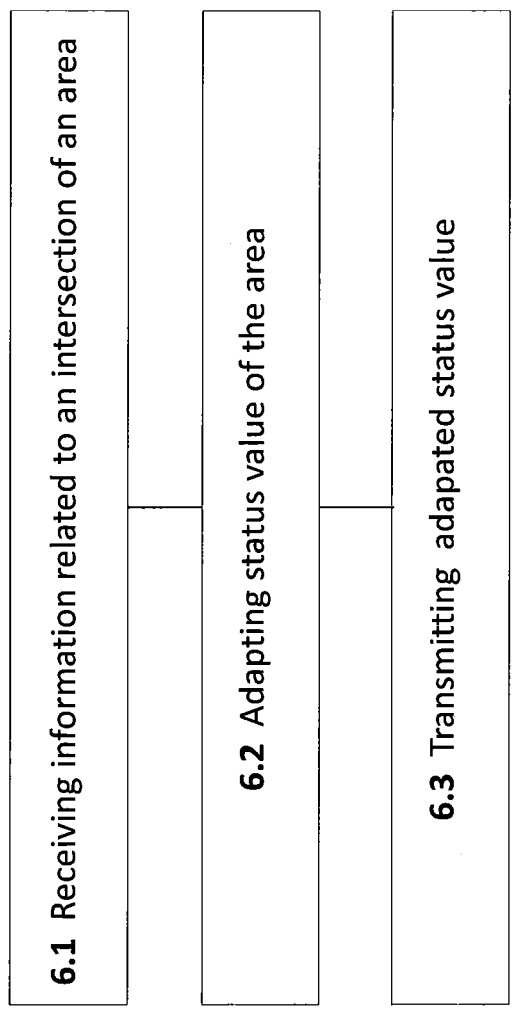
FIG. 6 illustrates an example of a method performed by a server.

FIG. 6 illustrates a method according to an embodiment performed by a server. Alternatively the method shown in FIG. 6 may be also performed by another device (for example ad-hoc communication between the devices may be used to coordinate movements of the devices).

In steps 6.1 information related to an intersection of a zone of a device with a border of an area is received. The information may comprise an indication if an intersection starts or stops, which zone of the device intersects and information about the border of the area which is intersected. Optionally the information received in step 6.1 may comprise properties of the device (for example speed and direction where the device moves). The information received in step 6.1 may be the information transmitted by a device in step 5.4 of FIG. 5 (see for example also step 4.5 of FIG. 4).

In step 6.2 of FIG. 6 the status value of the area where the intersection starts or stops with is adapted (see for example also step 4.6 or 4.9 of FIG. 4). The adapted status value may depend on various factors like for example if the intersection starts of stops and which zone around the device is intersecting. Especially the zone which starts to intersect may lead to an adaptation of the status value based on the zone type. For example if an intersection of a "lower priority warning zone" of the device start to intersect with a border of an area which had the status "empty" earlier, the status value of the area may be changed to "low priority warning" in line with the intersecting zone of the device. However, if the earlier status of the area was already "low priority warning" or "immediate priority warning" (for example caused by another device), then the status may remain unchanged (a status value of an area may be always kept on the highest priority level if several devices report, or have reported, zone intersections). On the other hand if the device reports a stop of the intersection of a zone, the status value of the area may be adapted to the lowest priority level of a still intersecting zone of the device or of an intersecting zone of another device. If no zone is intersecting the border of the area anymore, the status valued of the area may be set back to the value "empty" (assuming that no device is located inside the zone).

The above mentioned status values of the area are just examples and do not limit the scope to those status value. In principle any kind of status values may be used as long as they reflect different levels (like for example different warning/priority levels as mentioned above). The same applies to the names of the zones around a device used above.

In step 6.3 of FIG. 6 the adapted status value of the area is transmitted (see for example also step 4.10 of FIG. 4). The transmitted status value in step 6.3 may be received by a device (see for example step 4.10 of FIG. 4 or step 5.1 of FIG. 5). In addition to the adapted status value also updated rule or criterion for determining the one or more zones around a device may be transmitted. The transmission may happen to the device with a zone that starts/stops to intersect with an area, or to other devices which are still intersecting the border of the area with one or more of their zones, or to devices located inside the area.

Figure 7:
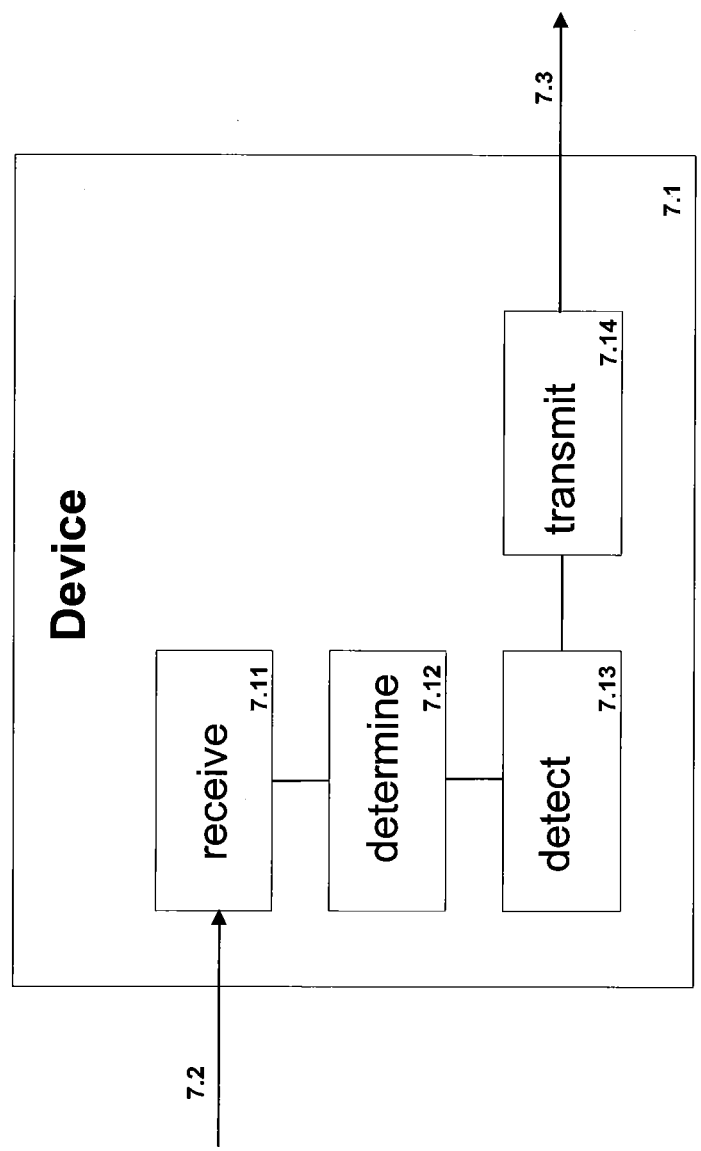
FIG. 7 shows an example block diagram of a device.

FIG. 7 shows an example block diagram of an embodiment of device 7.1 comprising means or units performing the functionality of the method shown in FIG. 5. A receiving means/unit 7.11 of device 7.1 may receive information 7.2 (see also step 5.1 of FIG. 5). A determining means/unit 7.12 may determine one or more zones around the device 7.1, or the change of one or more zones around the device (see step 5.2 of FIG. 5). A detecting means/unit 7.13 will perform detecting if a zone of the device 7.1 is intersecting (for example starts or stops to intersect) with the border of an area (see also step 5.3 of FIG. 5). If the detection is affirmative (for example an intersection has started or stopped), transmitting means/unit 7.14 of device 7.1 may transmit information 7.3 towards a server or another device (see for example step 5.4 of FIG. 5 or step 4.5 of FIG. 4).

Figure 8:
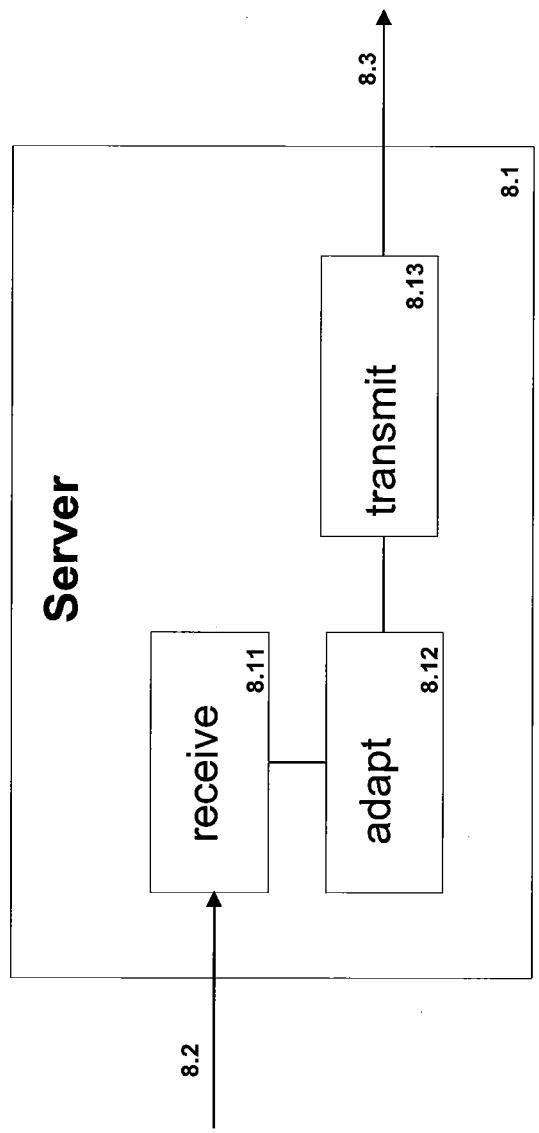
FIG. 8 shows an example block diagram of a server.

FIG. 8 shows an example block diagram of an embodiment of server 8.1 comprising means or units performing the steps of the method shown in FIG. 6. The element may be a server or a device.

A receiving means/unit 8.11 of element 8.1 may receive information 8.2 as explained with respect to step 6.1 of FIG. 6. An adapting means/unit 8.12 may then adapt the status of an area in line with step 6.2 of FIG. 6. Finally a transmitting means/unit 8.13 will transmit the adapted status information (optionally with additional information) in line with step 6.3 of FIG. 6.

Figure 9:
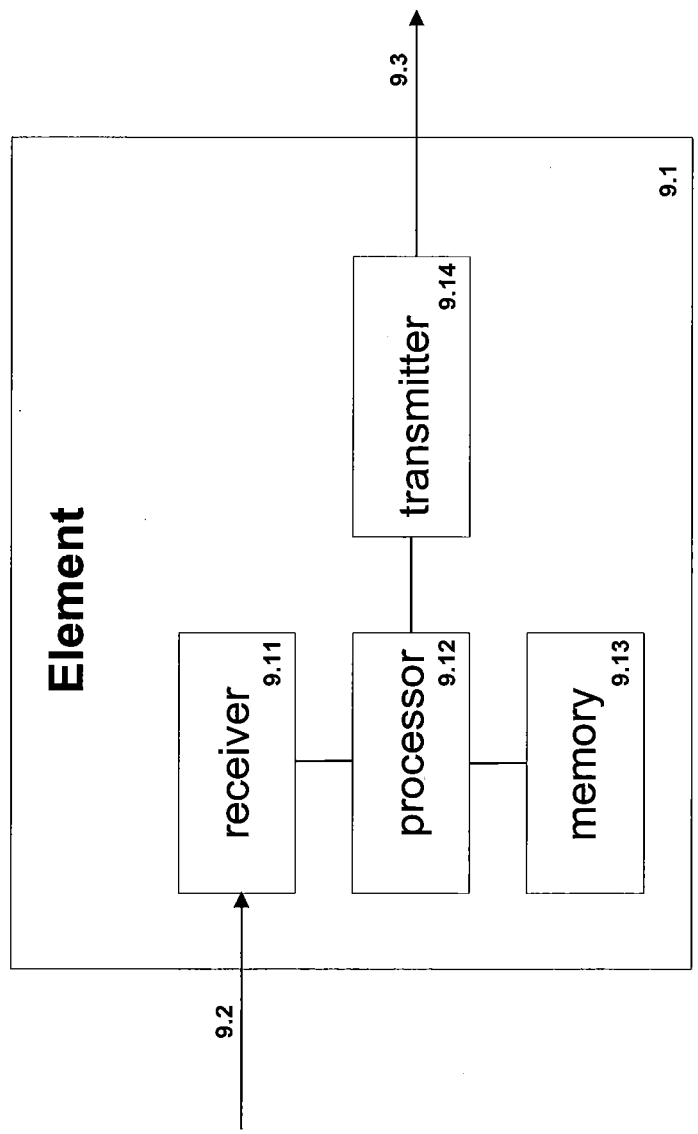
FIG. 9 shows an example block diagram of an element.

FIG. 9 is an example block diagram illustrating embodiments of an element 9.1 which could be a device (for example a user, an end device or a wireless device) or a network element (like for example a server). Examples of the device comprise a mobile phone, a smart phone, a PDA (Personal Digital Assistant), a portable computer (e.g., laptop, tablet), a machine-to-machine device or any other device that can provide wireless communication. A wireless device may also be referred to as a radio node, user equipment (UE), or an on-board unit in a further device, like for example a car or a vehicle which may move airborne, underwater or in the outer space. Examples of a network element comprise a server, a gateway, a controller, a base station or any other network element.

The element may comprise a receiver 9.11, a processor 9.12, a memory 9.13 and a transmitter 9.14. The receiver 9.11 and the transmitter 9.14 may be combined in a transceiver (not shown). They may transmit signals from and to the element 9.1. Signals may be transmitted wirelessly (e.g., via an antenna which is not shown). Processor 9.12 may execute instructions to provide some or all of the functionality described above as being provided by the device/server/element, and memory 9.13 may store instructions executed by processor 9.12.

Processor 9.12 may comprise any suitable combination of hardware and software implemented in one or more modules to execute instructions and manipulate data to perform some or all of the described functions of the elements (for example the device or the server). In some embodiments, processor 9.12 may comprise one or more computers, one or more central processing units (CPUs), one or more microprocessors, one or more applications, and/or other logic.

Memory 9.13 may be generally operable to store instructions, such as a computer program, software, an application comprising one or more of logic, rules, algorithms, code, tables, etc. and/or other instructions capable of being executed by a processor. Examples of memory 9.13 may comprise computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

Alternative embodiments of the device 7.1, the server 8.1 and the element 9.1 may comprise additional components beyond those shown in FIGS. 7 to 9 that may be responsible for providing certain aspects of the functionality, including any of the functionality described herein and/or any additional functionality (including any functionality necessary to support the solution described herein).

Figure 10:
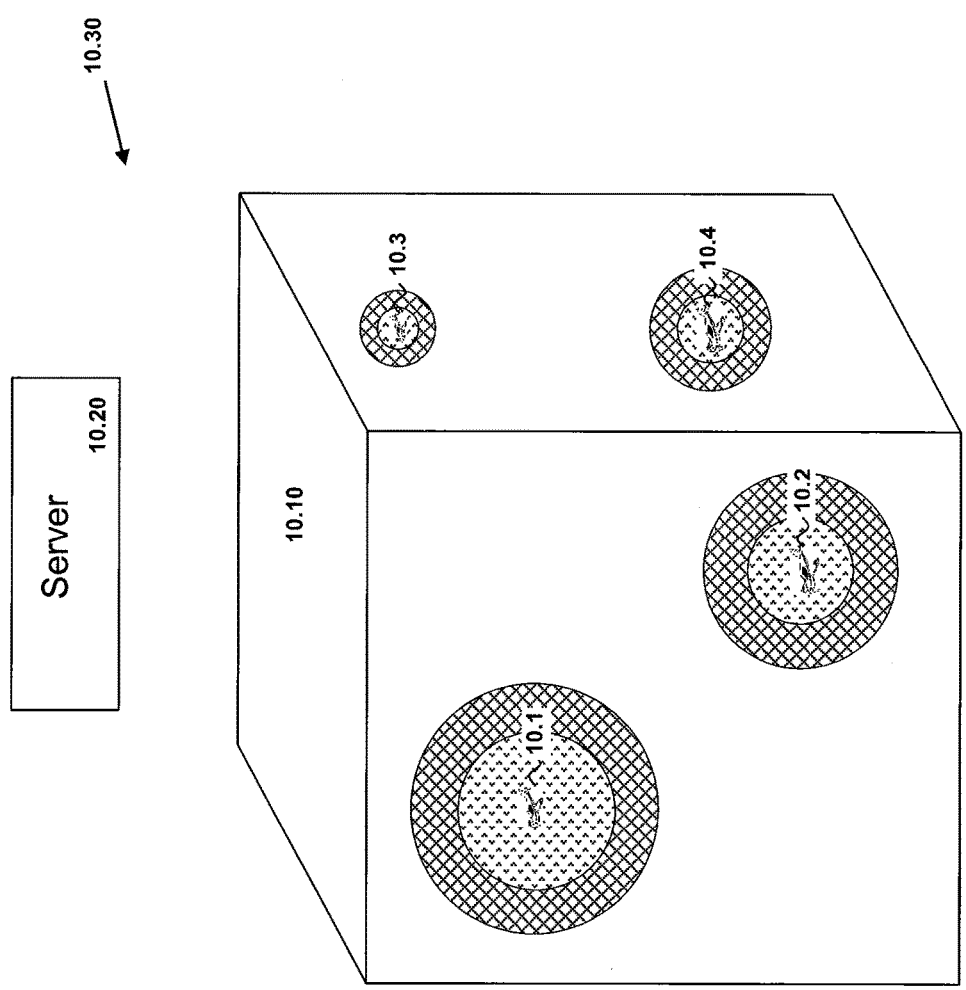
FIG. 10 shows an example system comprising of a server and devices.

FIG. 10 shows an example system comprising a server 10.20 and devices 10.1, 10.2, 10.3 and 10.4. The devices are located in an area (cube) 10.10 and may communicate with the server 10.20 as described above.

Various different types of elements may comprise components having the same physical hardware but may be configured (e.g., via programming) to support different radio access technologies, or may represent partly or entirely different physical components.

Some embodiments of the disclosure may provide one or more technical advantages. Some embodiments may benefit from some, none, or all of these advantages. Other technical advantages may be readily ascertained by one of ordinary skill in the art.

In a first example embodiment a method for a device moving in a space is provided, the method comprising determining of one or more zones around the device, wherein the one or more zones are linked to the device and move together with the device through the space, detecting if a border of a first of the one or more zones starts to intersect or stops to intersect with a border of an area inside the space, and transmitting information related to the intersection when the detecting is affirmative.

Refinements of the first example embodiment may comprise:

the detecting if a border of the first zone starts to intersect or stops to intersect with the border of the area may depend from at least one of the following factors: moving of the device, change of a size or a form of the first zone around the device, and change of a size or a form of the area.

the size or the form of the first zone may depend on a rule taking a criterion into account.

the size or the form of the first zone may be adapted when the rule or the criterion changes.

the criterion may comprise at least one of speed of the device, direction of the device, type of the device, class of the device, location information of the device, traffic information in the proximity of the device, time of the day, application type and weather conditions.

the transmitting information related to the intersection may comprise transmitting one or more of: indication that an intersection started, indication that an intersection stopped, information about the first zone around the device which starts or stops to intersect, information about the border of the area where the intersection is started or stopped, information about other zones around the device.

receiving one or more of status information of the area, status information of the border of the area, status information of a further area, wherein the further area is intersecting with the one or more zones around the device, the rule, the criterion.

the received status information of the area may influence the moving of the device.

a second zone out of the one or more zones may be either enclosing the first zone or enclosed by the first zone.

a size or a form of the second zone may depend on the same or a different rule than the first zone.

wherein the method may be performed by the device.

wherein the device may be a vehicle or a mobile device.

wherein the space, the zones and the areas may be either two-dimensional or three-dimensional.

wherein the first three/dimensional zone may comprise a sphere or a lobe.

wherein the area may comprise a cubical form.

In a second example embodiment a method for processing information related to a device moving in a space is provided, the method comprising receiving information from the device located in a first area inside the space indicating that a border of a zone around the device starts to intersect or stops to intersect with a border of a second area inside the space, adapting a status value of the second area in dependence of the received information.

Refinements of the second example embodiment may comprise:

the adapted status value may depend from the zone around the device and if the intersection starts or stops.

transmitting the adapted status value to at least one of the device, another device located in the second area and a further device outside the second area if a zone around the further device intersects with the second area.

different zones around the device may be linked to different status values.

the receiving may further comprise to receive one or more of an indication that an intersection started, an indication that an intersection ended, information about the zone around the device which starts or ends to intersect, information about the border of the second area at which the intersection is started or stopped, and information about other zones around the device.

the transmitting may further comprise to transmit one or more of status information of the second area, status information of the border of the second area, status information of a further area, wherein the further area is intersecting with one or more zones around the device, a rule how to determine a size and a form of the zone around the device or how to calculate parameters for determining the size and the form of the zone around the device, a criterion taken by the rule into account.

the space, the zones and the areas may be either two-dimensional or three-dimensional.

the second area may comprise a cubical form.

the method may be performed by a server or by another device.

the device may be a vehicle or a mobile device.

In a third example embodiment a computer program is provided, the computer program comprising instructions which, when executed on at least one processor, cause the at least one processor to carry out a method according to the first or the second example embodiments.

A carrier may contain the computer program of the third example embodiment wherein the carrier may be one of an electronic signal, an optical signal, a radio signal or a computer readable storage medium.

In a fourth example embodiment a device moving in a space is provided, the device comprising a determining means for determining one or more zones around a device, wherein the one or more zones are linked to the device and move together with the device through the space, a detecting means for detecting if a border of a first of the one or more zones starts to intersect or stops to intersect with a border of an area inside the space, and a transmitting means for transmitting information related to the intersection when the detecting is affirmative.

In a fifth example embodiment a device moving in a space is provided, the device comprises a processor and a memory, said memory containing instructions executable by said processor, whereby said apparatus is operative to determine one or more zones around a device, wherein the one or more zones are linked to the device and move together with the device through the space, to detect if a border of a first of the one or more zones starts to intersect or stops to intersect with a border of an area inside the space, and to transmit information related to the intersection when the detecting is affirmative.

Refinements of the fourth and fifth example embodiment may comprise the device adapted to perform the refinements of the first example embodiment.

In an sixth embodiment an apparatus for processing information related to a device moving in a space is provided, the apparatus comprising a receiving means for receiving information from the device located in a first area inside the space indicating that a border of a zone around the device starts to intersect or stops to intersect with a border of a second area inside the space, and an adapting means for adapting a status value of the second area in dependence of the received information.

In a seventh example embodiment an apparatus for processing information related to a device moving in a space is provided, the apparatus comprises a processor and a memory, said memory containing instructions executable by said processor, whereby said apparatus is operative to receive information from the device located in a first area inside the space indicating that a border of a zone around the device starts to intersect or stops to intersect with a border of a second area inside the space, and to adapt a status value of the second area in dependence of the received information.

Refinements of the sixth and seventh example embodiment may comprise the apparatus adapted to perform the refinements of the second example embodiment.

In an eighth example embodiment a system for detecting a device moving in a space is provided, said system comprising a device according to the fourth or fifth example embodiment and an apparatus according to the sixth or seventh example embodiment, wherein the device transmits information related to the intersection to the apparatus It is to be understood that the examples and embodiments as explained above are merely illustrative and susceptible to various modifications. For example, the concepts could be used in other types of communication networks, not explicitly mentioned so far. Further, it is to be understood that the above concepts may be implemented by using correspondingly designed software in existing nodes, or by using dedicated hardware in the respective nodes.

The invention claimed is:

1. A method for a device moving within a space including two or more areas, each of the two or more areas defined by a border separating the two or more areas inside the space, said method comprising:
   determining, by at least one processor, one or more zones surrounding the device, wherein the one or more zones are linked to the device and move together with the device through the space, each zone of the one or more zones defined by a border,
   detecting, by the at least one processor, a border of a first zone of the one or more zones starts to intersect or stops to intersect with a border of one of the two or more areas inside the space, and
   transmitting, by the at least one processor to a network element, an indication that an intersection has one of started and stopped between the border of the one or more zones and the border defining one of the two or more areas and information related to the intersection to notify the network element of a direction of movement of the device within the space responsive to the detecting that the border of the first zone of the one or more zones starts to intersect or stops to intersect with a border of one of the two or more areas inside the space.

2. The method of claim 1, wherein the detecting a border of the first zone starts to intersect or stops to intersect with the border of one of the two or more areas comprises one of:
   determining movement of the device,
   determining a change of a size or a form of the first zone around the device, and
   determining a change of a size or a form of the one of the two or more areas.

3. The method of claim 2, wherein determining the change of the size or the form of the first zone is based on one of a rule taking a criterion into account, and a determination that the rule or the criterion has changed.

4. The method of claim 3, wherein the criterion comprise at least one of:
   speed of the device,
   direction of the device within the two or more areas,
   type of the device,
   class of the device,
   location information of the device,
   traffic information within the two or more areas,
   time of the day,
   application type, and
   weather conditions.

5. The method of claim 3, the method further comprises receiving, by the at least one processor from the network element, one or more of
   status information of the one of the two or more areas,
   status information of the border of the one of the two or more areas,
   status information of a further area of the two or more areas, wherein the further area is intersecting with the border of one or more zones surrounding the device,
   the rule,
   the criterion.

6. The method of claim 1, wherein the information related to the intersection comprises one or more of:
   information about the border of the first zone surrounding the device which starts or stops to intersect with the border of the one of the two or more areas,
   information about the border of the one of the two or more areas where the intersection is started or stopped,
   information about other zones of the one or more zones surrounding the device.

7. A computer program product comprising a non-transitory computer readable storage medium storing instructions which, when executed on at least one processor, cause the at least one processor to carry out a method according to claim 1.

8. A method for a network element comprising at least one processor to process information related to a device moving within a space including two or more areas, each of the two or more areas defined by a border separating the two or more areas inside the space, said method comprising:
   receiving, by the at least one processor, information from the device located in a first area of the two or more areas inside the space, the information indicating that an intersection has one of started and stopped between a border of one or more zones surrounding the device with a border of a second area of the two or more areas inside the space, and
   adapting, by the at least one processor, a status value of the second area in dependence of the received information to track the movement of the device within the space.

9. The method of claim 8, wherein the adapted status value depends from the border of the one or more zones surrounding the device and a current status value of the second area.

10. The method of claim 8, the method further comprising transmitting, by the at least one processor, the adapted status value to at least one of
    the device,
    another device located in the second area; and
    a further device outside the second area and within the two or more areas inside the space if a zone surrounding the further device intersects with the second area.

11. The method of claim 8, wherein different zones of the one or more zones surrounding the device are linked to different status values of the two or more areas within the space.

12. The method of claim 8, wherein the receiving further comprises to receive, by the at least one processor, one or more of:
    information about the border of the first zone surrounding the device which starts or stops to intersect with the border of the one of the two or more areas, information about the border of the one of the two or more areas where the intersection is started or stopped, and
information about other zones of the one or more zones surrounding the device.

13. The method of any of claim 8, wherein the transmitting further comprises to transmit, by the at least one processor, one or more of:
   status information of the one of the two or more areas,
   status information of the border of the one of the two or more areas,
   status information of a further area of the two or more areas, wherein the further area is intersecting with the border of one or more zones surrounding the device,
   a rule how to determine a size and a form of the one or more zones around the device or how to calculate parameters for determining the size and the form of the one or more zones surrounding the device, and
   a criterion taken by the rule for determining the size and the form of the one or more zones around the device or for calculating the parameters for determining the size and the form of the one or more zones surrounding the device.

14. A computer program product comprising a non-transitory computer readable storage medium storing instructions which, when executed on at least one processor, cause the at least one processor to carry out a method according to claim 8.

15. A device moving within a space comprised of two or more areas, each of the two or more areas defined by a border separating the two or more areas inside the space, said device comprising:
   a processor; and
   a memory coupled to the processor and storing program code that when executed by the processor cause the processor to:
      determine one or more zones surrounding a device, wherein the one or more zones are linked to the device and move together with the device through the space, each zone of the one or more zones defined by a border,
      detect a border of a first zone of the one or more zones starts to intersect or stops to intersect with a border of one of the two or more areas inside the space, and
      transmit, to a network element, an indication that an intersection has one of started and stopped between the border of the one or more zones and the border defining one of the two or more areas and information related to the intersection to notify the network element of a direction of movement of the device within the space responsive to the detecting the border of the first zone of the one or more zones has started intersecting or stopped intersecting with the border of one of the two or more areas inside the space.

16. The device according to claim 15, wherein the detecting if a border of first of the one or more zones starts to intersect or stops to intersect with a border of an area inside the space is depends from at least one of the following factors:
   moving of the device,
   change of a size or a form of the first zone surrounding the device, and
   change of a size or a form of the area.

17. The device according to claim 16, wherein determining the change of the size or the form of the first zone is based on one of a rule taking a criterion into account and a determination that the rule or the criterion has changed.

18. The device according to claim 17, wherein the criterion comprise at least one of:
   speed of the device,
   direction of the device within the two or more areas,
   type of the device,
   class of the device,
   location information of the device,
   traffic information within the two or more areas,
   time of the day,
   application type, and
   weather conditions.

19. The device according to claim 17, the program code when executed by the processor further cause the processor to receive one or more of:
   status information of the one of the two or more areas,
   status information of the border of the one of the two or more areas,
   status information of a further area of the two or more areas, wherein the further area is intersecting with the border of one or more zones surrounding the device,
   the rule, and
   the criterion.

20. The device according to claim 19, wherein the received status information of the one of the two or more areas influences the moving of the device.

21. The device according to claim 15, wherein the transmitting information related to the intersection comprises transmitting one or more of:
   information about the border of the first zone surrounding the device which starts or stops to intersect with the border of the one of the two or more areas,
   information about the border of the one of the two or more areas where the intersection is started or stopped,
   information about other zones of the one or more zones surrounding the device.

22. The device according to claim 15, wherein the space, the one or more zones and the two or more areas are either two-dimensional or three-dimensional.

23. An apparatus for processing information related to a device moving within a space including two or more areas, each of the two or more areas defined by a border separating the two or more areas inside the space, said apparatus comprising:
   a processor; and
   a memory coupled to the processor and storing program code that when executed by the processor cause the processor to:
      receive information from the device located in a first area of the two or more areas inside the space, the information indicating that an intersection has one of started and stopped between a border of one or more zones surrounding the device with a border of a second area of the two or more areas inside the space, and
      adapt a status value of the second area in dependence of the received information to track the movement of the device within the space.

24. The apparatus of claim 23, wherein the adapted status value depends from the zone surrounding the device and whether the intersection starts or stops.

25. The apparatus of claim 23, the program code when executed by the processor further cause the processor to transmit the adapted status value to at least one of
   the device;
   another device located in the second area; and a further device outside the second area and within the two or more areas inside the space if a zone surrounding the further device intersects with the second area.

26. The apparatus of claim 23, wherein different zones of the one or more zones surrounding the device are linked to different status values of the two or more areas within the space.

27. The apparatus of claim 23, wherein the processor receives one or more of:
information about the border of the zone surrounding the device which starts or ends to intersect with the border of the one of the two or more areas,
information about the border of the second area at which the intersection is started or stopped, and
information about other zones of the one or more zones surrounding the device.

28. The apparatus of claim 23, wherein processor transmits one or more of:
status information of the second area,
status information of the border of the second area,
status information of a further area, wherein the further area is intersecting with one or more zones surrounding the device,
a rule how to determine a size and a form of the zone surrounding the device or how to calculate parameters for determining the size and the form of the zone surrounding the device, and
a criterion taken by the rule into account.

* * * * *